United States Patent
Kume et al.

(10) Patent No.: US 11,217,851 B2
(45) Date of Patent: Jan. 4, 2022

(54) BATTERY MODULE

(71) Applicant: Panasonic Intellectual Property Management Co., Ltd., Osaka (JP)

(72) Inventors: Shingo Kume, Osaka (JP); Toshiya Gotou, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 141 days.

(21) Appl. No.: 16/639,079

(22) PCT Filed: Aug. 30, 2018

(86) PCT No.: PCT/JP2018/032046
§ 371 (c)(1),
(2) Date: Feb. 13, 2020

(87) PCT Pub. No.: WO2019/049760
PCT Pub. Date: Mar. 14, 2019

(65) Prior Publication Data
US 2020/0212390 A1  Jul. 2, 2020

(30) Foreign Application Priority Data
Sep. 7, 2017 (JP) .............................. JP2017-172389

(51) Int. Cl.
*H01M 2/10* (2006.01)
*H01M 10/613* (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ............ H01M 10/613; H01M 10/625; H01M 10/647; H01M 10/6554; H01M 10/6556; H01M 10/6567; H01M 50/20; Y02E 60/10
See application file for complete search history.

(56) References Cited

U.S. PATENT DOCUMENTS

| | | | |
|---|---|---|---|
| 2011/0151314 A1* | 6/2011 | Ogawa ................ | H01M 10/613 429/158 |
| 2014/0370363 A1* | 12/2014 | Oshiba ................ | H01M 10/625 429/151 |

FOREIGN PATENT DOCUMENTS

JP    2012-181972    9/2012

OTHER PUBLICATIONS

International Search Report of PCT application No. PCT/JP2018/032046 dated Oct. 2, 2018.

* cited by examiner

*Primary Examiner* — Lingwen R Zeng
(74) *Attorney, Agent, or Firm* — McDermott Will & Emery LLP (57) ABSTRACT

A battery module includes battery stacks, a first restraining part, and a plurality of second restraining parts. The first restraining part has: a flat plate part; a plurality of first wall parts that protrude from a main surface of the flat plate part, extend in a stacking direction of the batteries, and are arranged in a first direction; and second wall parts extending in the first direction at end parts of each wall part. The second restraining parts are disposed individually corresponding to the first wall parts and each have: a belt part extending parallel to the flat plate part; a third wall part protruding from the belt part toward the first wall part and extending in the stacking direction; and fourth wall parts extending in the first direction at end parts of the third wall (Continued)

part. There are arranged a plurality of housing spaces for the battery stacks.

8 Claims, 4 Drawing Sheets

(51) Int. Cl.
*H01M 10/625* (2014.01)
*H01M 10/647* (2014.01)
*H01M 10/6556* (2014.01)
*H01M 10/6567* (2014.01)
*H01M 10/6554* (2014.01)
*H01M 50/20* (2021.01)

(52) U.S. Cl.
CPC ..... *H01M 10/647* (2015.04); *H01M 10/6554* (2015.04); *H01M 10/6556* (2015.04); *H01M 10/6567* (2015.04); *Y02E 60/10* (2013.01)

BATTERY MODULE

TECHNICAL FIELD

The present invention relates to a battery module.

BACKGROUND ART

As a power source for which a high output voltage is required, for example, vehicles and the like, there is known a battery stack in which a plurality of batteries are series connected (for example, see PTL 1). In general, a battery stack has a module structure in which a predetermined number of batteries are stacked and are restrained or fastened with binding bars. Further, a plurality of the battery stacks are housed in a battery pack.

CITATION LIST

Patent Literature

PTL 1: Unexamined Japanese Patent Publication No. 2012-181972

SUMMARY OF THE INVENTION

The present inventors have conceived a battery module having a novel structure after intensive studies on conventional battery modules.

The present invention has been made in view of such a situation, and an object of the present invention is to provide a battery module having a novel structure.

An aspect of the present invention is a battery module. The battery module includes: battery stacks each having a plurality of stacked batteries; and a first restraining part and a plurality of second restraining parts that restrain the battery stacks. The first restraining part has: a flat plate part; a plurality of first wall parts that protrude from a main surface of the flat plate part, extend in a stacking direction of the batteries, and are arranged in a first direction intersecting the stacking direction; and second wall parts extending in the first direction at end parts, in the stacking direction, of the first wall parts. Each of the second restraining parts is disposed corresponding to at least a part of each of the first wall parts and has: a belt part extending parallel to the flat plate part; a third wall part protruding from the belt part toward the first wall part and extending in the stacking direction; and fourth wall parts extending in the first direction at end parts, in the stacking direction, of the third wall part. On the flat plate part, there are arranged a plurality of housing spaces for the battery stacks, and each of the housing spaces is separated by the flat plate part, the first wall parts, the second wall parts, the belt parts, the third wall parts, and the fourth wall parts.

The present invention can provide a battery module having a novel structure.

BRIEF DESCRIPTION OF DRAWINGS

FIG. 3 is a partially enlarged side view of the battery module.

DESCRIPTION OF EMBODIMENT

Hereinafter, the present invention will be described based on a preferred exemplary embodiment with reference to the drawings. The exemplary embodiment is an example and does not limit the invention, and features described in the exemplary embodiment and combinations of the features are not all necessarily essential to the invention. The same reference marks are assigned to the same or equivalent structural components, members, and processes illustrated in the drawings, and a duplicate description will be appropriately omitted. Further, scales or shapes of parts illustrated in the drawings are conveniently set for the sake of easy understanding, and should not be interpreted as limitation unless particularly mentioned. Further, even the same members may slightly differ between the drawings in scale or the like in some cases. Further, terms "first", "second", and the like, when used in the present description and the claims, do not mean any order or degree of importance unless particularly mentioned, but are intended to distinguish one component from another.

Figure 1:
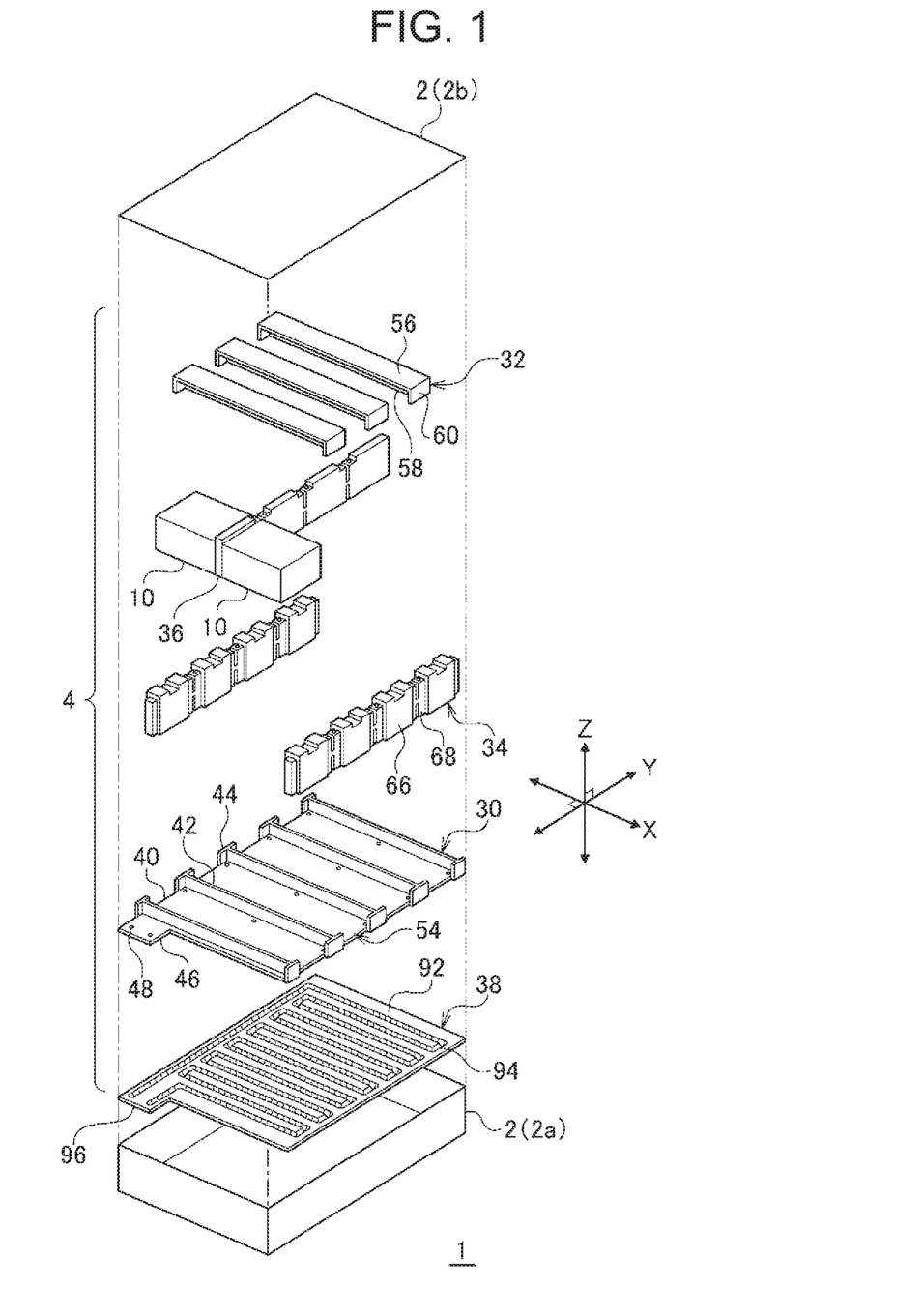
FIG. 1 is an exploded perspective view showing a schematic structure of a battery pack including a battery module according to an exemplary embodiment.
Figure 2:
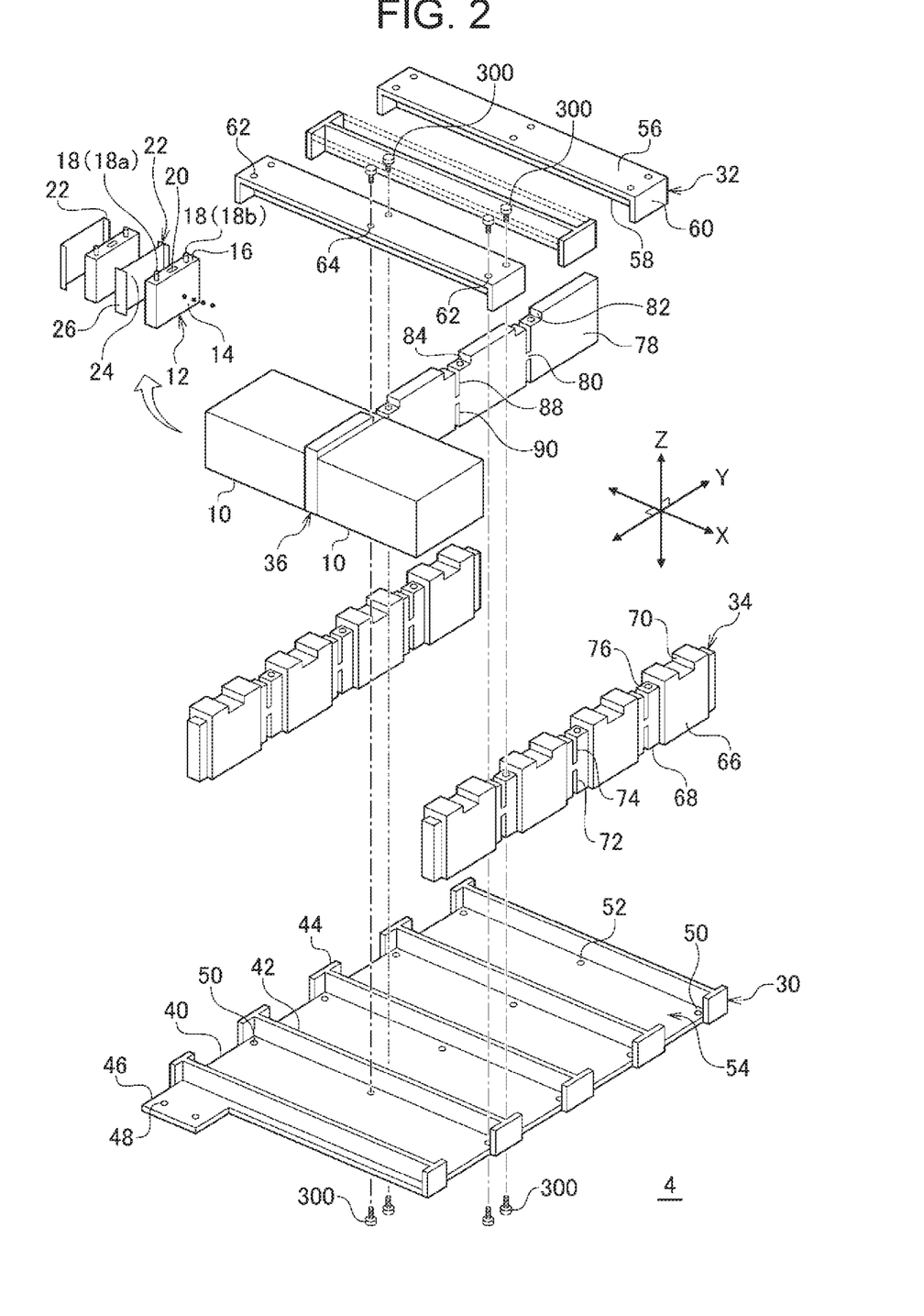
FIG. 2 is an exploded perspective view showing a schematic structure of the battery module.
Figure 3A:
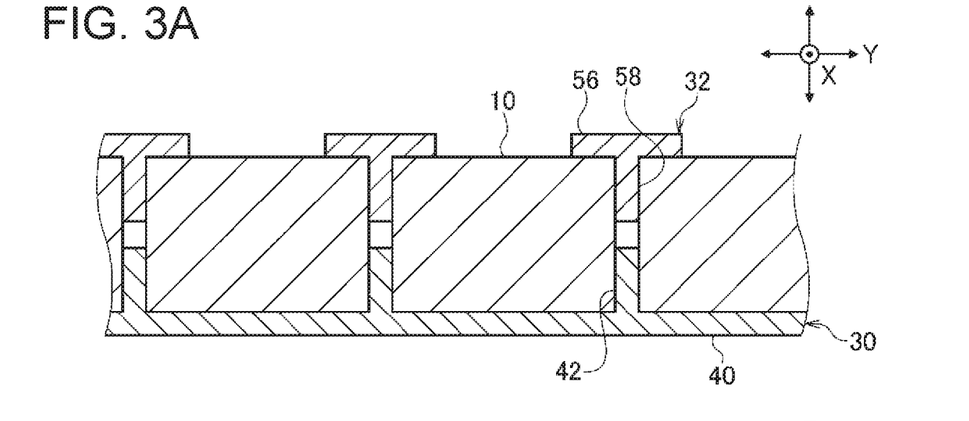
FIG. 3 is a partially enlarged cross-sectional view of the battery module.
Figure 3B:
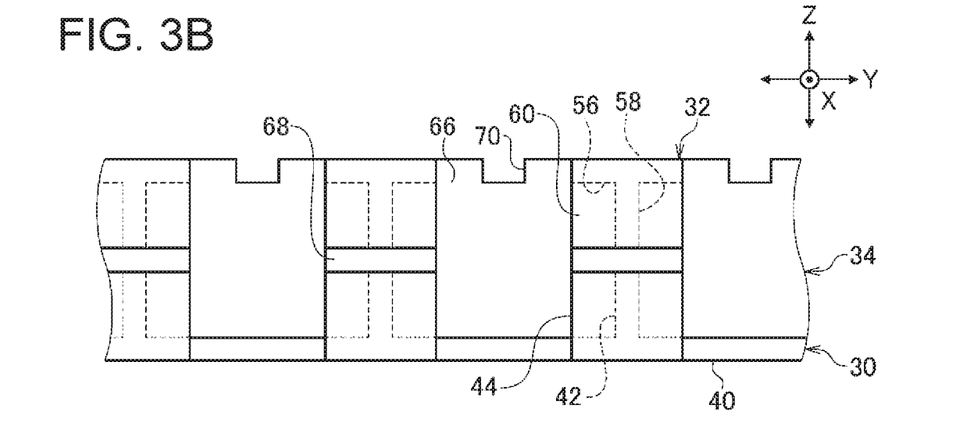
Figure 3C:
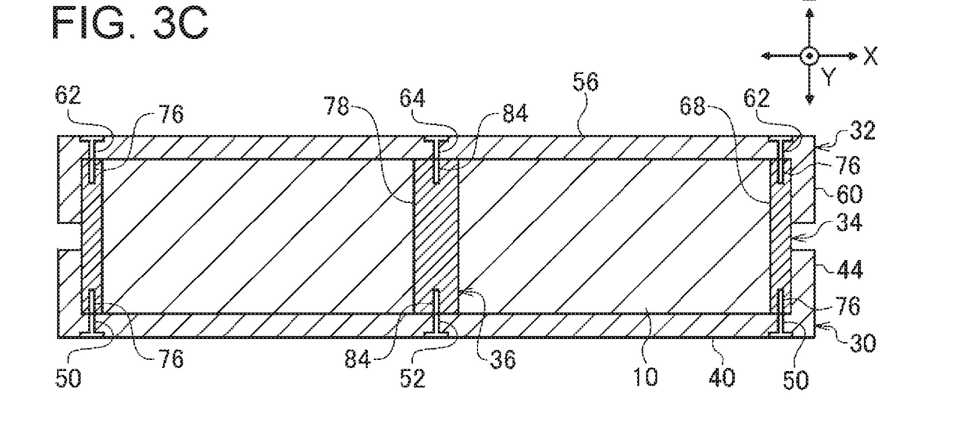
FIG. 3C is a cross-sectional view of the battery module.

FIG. 1 is an exploded perspective view showing a schematic structure of a battery pack including a battery module according to the exemplary embodiment. FIG. 2 is an exploded perspective view showing a schematic structure of the battery module. FIG. 3A is a partially enlarged cross-sectional view of the battery module. FIG. 3B is a partially enlarged side view of the battery module. FIG. 3C is a cross-sectional view of the battery module. FIG. 3A is a cross-sectional view in a direction perpendicular to a stacking direction of batteries, and FIG. 3B is a side view as viewed from the stacking direction, and FIG. 3C is a cross-sectional view in the stacking direction. Note that, FIG. 1 illustrates the battery stacks in simplified form but does not illustrate fastening members or insertion holes where the fastening members are inserted. FIG. 2 does not illustrate a cooling part. FIG. 2 illustrates an exploded view of the battery stack. Further, regarding a part of second restraining parts, a belt part is transparently illustrated. FIGS. 3A to 3C do not illustrate a cooling part. In FIGS. 3A and 3C, the battery stacks are illustrated in simplified form, and an internal structure of each battery is not illustrated.

Battery pack 1 includes housing 2 and battery module 4. Housing 2 is a container that houses battery module 4. Housing 2 preferably has waterproof properties. However, housing 2 does not have to have waterproof properties. Housing 2 includes container part 2a having an opening and lid part 2b that covers the opening of container part 2a. Container part 2a has a bottom plate and a side wall standing from a periphery of the bottom plate. Housing 2 is fixed to a mounting object such as a vehicle body (not shown).

Battery module 4 includes battery stacks 10, first restraining part 30, a plurality of second restraining parts 32, a pair of end plates 34, intermediate part 36, and cooling part 38.

Battery stacks 10 each have a plurality of stacked batteries 12. Each battery 12 is a rechargeable secondary battery such as a lithium ion battery, a nickel metal hydride battery, or a nickel-cadmium battery. Battery 12 is a so-called prismatic battery, and has outer package can 14 having a flattened rectangular parallelepiped shape. On one surface of outer package can 14, there is provided an approximately rectangular opening (not shown), through which an electrode assembly, electrolyte, and the like are put into outer package can 14. Outer package can 14 is covered with an insulating sheet (not shown) such as a shrink tube. By covering the surface of outer package can 14 with the insulating sheet, it is possible to prevent or reduce short circuit between neighboring batteries 12 and between battery 12 and each of first restraining part 30, second restraining parts 32, end plates 34, and intermediate part 36. On the opening of outer package can 14, sealing plate 16 is provided to seal outer package can 14.

On sealing plate 16, output terminal 18 of a positive electrode is provided close to one end of sealing plate 16 in a longitudinal direction, and output terminal 18 of a negative electrode is provided close to the other end of sealing plate 16 in the longitudinal direction. Hereinafter, output terminal 18 of the positive electrode is referred to as positive-electrode terminal 18a, and output terminal 18 of the negative electrode is referred to as negative-electrode terminal 18b as appropriate. Further, when there is no need to distinguish polarities of output terminals 18, positive-electrode terminal 18a and negative-electrode terminal 18b are collectively referred to as output terminals 18. Outer package can 14, sealing plate 16, and output terminals 18 are made of electric conductors and, for example, are made of metal.

In the present exemplary embodiment, a surface of battery 12 on a side where sealing plate 16 is provided is assumed as an upper surface of battery 12, and a surface of battery 12 on a side opposite to the upper surface is assumed as a bottom surface of battery 12. Further, battery 12 has two main surfaces connecting the upper surface and the bottom surface to each other. The main surfaces have the largest area among six surfaces of battery 12. Two remaining surfaces other than the upper surface, the bottom surface, and the two main surfaces are assumed as side surfaces of battery 12. Further, the upper surface side of battery 12 is assumed as an upper surface of battery stack 10, and the bottom surface side of battery 12 is assumed as a bottom surface of battery stack 10. Further, for the sake of convenience, the upper surface side of battery stack 10 is assumed as a vertically upward direction, and the bottom surface side of battery stack 10 is assumed as a vertically downward direction.

In sealing plate 16, safety valve 20 is provided between the pair of output terminals 18. Safety valve 20 is configured to release an internal gas by being opened when an internal pressure of outer package can 14 is increased to greater than or equal to a predetermined value. A gas discharged from safety valve 20 of each battery 12 is discharged to the outside of housing 2 through an exhaust duct (not shown).

The plurality of batteries 12 are stacked on each other with the main surfaces of neighboring batteries 12 facing each other. Note that the term "stack" means an arrangement of a plurality of members in any one direction. Therefore, the stack of batteries 12 also includes an arrangement of the plurality of batteries 12 in a horizontal direction. Further, batteries 12 are arranged such that output terminals 18 face in the same direction (face the vertically upward direction in this case, for the sake of convenience). Two neighboring batteries 12 are stacked such that positive-electrode terminal 18a of one battery 12 and negative-electrode terminal 18b of another battery 12 are disposed adjacent to each other. Positive-electrode terminal 18a and negative-electrode terminal 18b are electrically connected to each other via a bus bar (not shown). However, output terminals 18 of the same polarity of two neighboring batteries 12 can be connected to each other via a bus bar.

Battery stack 10 also includes a plurality of separators 22. Separators 22 are each made of, for example, a resin having insulating properties. The plurality of batteries 12 and the plurality of separators 22 are stacked alternately. Separators 22 each have: flat part 24 parallel to the main surfaces of battery 12; and wall ports 26 extending from end parts of flat part 24 in stacking direction X of batteries 12 (the direction indicated by arrow X in each drawing).

Each flat part 24 extends between the main surfaces of two neighboring batteries 12 facing each other. This arrangement insulates more securely between outer package cans 14 of neighboring batteries 12. One flat part 24 extends between battery 12 and end plate 34 and another flat part 24 extends between battery 12 and intermediate part 36. This arrangement insulates more securely between outer package can 14 of battery 12 and each of end plate 34 and intermediate part 36. Further, walls 26 cover the side surfaces of batteries 12. This arrangement insulates more securely between outer package cans 14 of batteries 12 and each of first wall parts 42 (to be described later) of first restraining part 30, and third wall parts 58 (to be described later) of second restraining parts 32.

First restraining part 30 and second restraining parts 32 are restrain members that restrain battery stacks 10. The plurality of batteries 12 included in battery stacks 10 are fastened with first restraining part 30 and second restraining parts 32. First restraining part 30 and second restraining parts 32 are made of a highly rigid material, for example, metal such as iron or stainless-steel. First restraining part 30 has flat plate part 40, a plurality of first wall parts 42, and a plurality of second wall parts 44. Flat plate part 40 is an approximately rectangular plate and extends parallel to an XY plane including a stacking direction X and a horizontal direction Y perpendicular to the stacking direction X. Flat plate part 40 has such outer dimensions that flat plate part 40 can be housed in container part 2a.

Flat plate part 40 has protrusion 46 protruding from one side of the rectangle in an extending direction of the XY plane. Protrusion 46 is provided with two through holes 48. To one through hole 48, a cooling medium pipe (not shown) is connected to supply a cooling medium to cooling part 38. To another through hole 48, a cooling medium pipe (not shown) is connected to collect the cooling medium from cooling part 38. Further, through holes 50 through which fastening members 300 to be described later are inserted are provided at positions, on flat plate part 40, corresponding to end plates 34. Through holes 52 through which fastening members 300 to be described later are inserted are provided at positions, on flat plate part 40, corresponding to intermediate part 36.

Each of the plurality of first wall parts 42 protrudes from a first main surface of flat plate part 40 and extends in the stacking direction X. Each first wall part 42 extends from one side, of flat plate part 40, extending in the horizontal direction Y to the other side facing, in the stacking direction X, the one side. Further, first wall parts 42 are arranged in a first direction intersecting the stacking direction X. In the present exemplary embodiment, the horizontal direction Y perpendicular to the stacking direction X is assumed as the first direction. A distance, in the horizontal direction Y, between neighboring first wall parts 42 is set depending on a dimension of the battery stack in the horizontal direction Y, more specifically, set to be almost the same as the dimension of the battery stack in the horizontal direction. A length of each first wall part 42 in the vertical direction Z is set to be less than or equal to half of a dimension of the battery stack 10 in the vertical direction Z.

Each second wall part 44 extends in the first direction, that is, in the horizontal direction Y at each of the both end parts, in the stacking direction X, of the first wall part 42. First wall parts 42 and second wall parts 44 are connected to each other at central parts of second wall parts 44 in the horizontal direction Y. Each second wall part 44 extends in the vertical direction Z in a range from a second main surface, of flat plate part 40, reversely facing the first main surface to an upper end of first wall part 42. Two second wall parts 44 neighboring each other in the horizontal direction Y are separated from each other by a predetermined distance.

A gap between two second wall parts 44 facing each other in the stacking direction X is at least greater than or equal to a dimension of battery stacks 10 in the stacking direction X. In the present exemplary embodiment, the gap between the pair of second wall parts 44 in the stacking direction X is set such that two battery stacks 10, the pair of end plate 34, and intermediate part 36 can be disposed in the gap. That is, in battery module 4 according to the present exemplary embodiment, two battery stacks 10 are housed in each housing space 54 in a row in the stacking direction X.

First restraining part 30 is formed as described below, for example. Specifically, a metallic sheet in a predetermined shape is first prepared, and the metallic sheet has protruding end parts that protrude from long sides of the rectangle and will become second wall parts 44. Then, the end parts of the metallic sheet are bent to form flat plate part 40 and second wall parts 44. Subsequently, long sides of narrow metallic sheets are welded to flat plate part 40, and the short sides are welded to second wall parts 44, so that first wall parts 42 are formed.

The plurality of second restraining parts 32 are disposed corresponding to at least part of plurality of first wall parts 42. In the present exemplary embodiment, second restraining parts 32 are disposed to overlap, as viewed from the vertical direction Z, first wall parts 42 except first wall parts 42 on the both ends in the horizontal direction Y. Each second restraining part 32 has belt part 56, third wall part 58, and fourth wall parts 60. Belt part 56 is a narrow plate-shaped member extending parallel to flat plate part 40. Further, belt part 56 extends in the stacking direction X. Further, through holes 62 through which fastening members 300 to be described later are inserted are provided at positions, on belt part 56, corresponding to end plates 34. Through holes 64 through which fastening members 300 to be described later are inserted are provided at positions, on belt part 56, corresponding to intermediate part 36.

Third wall part 58 protrudes from a surface, of belt part 56, facing flat plate part 40 toward first wall part 42 and extends in the stacking direction X. Third wall part 58 is disposed to overlap first wall part 42 as viewed from the vertical direction Z. A length of third wall part 58 in the vertical direction Z is set to be less than or equal to half of the dimension of battery stack 10 in the vertical direction Z. In the present exemplary embodiment, a length of first wall part 42 in the vertical direction Z is set to be less than or equal to half of the dimension of battery stack 10 in the vertical direction Z. Further, a length of third wall part 58 in the vertical direction Z is also set less than or equal to be half of the dimension of battery stack 10 in the vertical direction Z. Therefore, a total length of first wall part 42 and third wall part 58 in the vertical direction Z is set to be less than or equal to the dimension of battery stack 10 in the vertical direction Z. However, without being particularly limited to this configuration, the length of one of first wall parts 42 and third wall part 58 in the vertical direction Z may be set to be greater than or equal to the half of the dimension of battery stack 10 in the vertical direction Z as long as the total length of first wall part 42 and third wall part 58 in the vertical direction Z is less than or equal to the dimension of battery stack 10 in the vertical direction Z.

Fourth wall parts 60 extend in the first direction, that is, in the horizontal direction Y at the both end parts, in the stacking direction X, of third wall part 58. Third wall parts 58 and fourth wall parts 60 are connected to each other at central parts of fourth wall parts 60 in the horizontal direction Y. Each fourth wall part 60 extends in the vertical direction Z in a range from a surface, of belt part 56, reversely facing flat plate part 40 to a lower end of third wall part 58. Fourth wall part 60 overlaps second wall part 44 as viewed from the vertical direction Z.

Second restraining parts 32 are each formed as described below, for example. Specifically, both end parts of a narrow metallic sheet are bent to form belt part 56 and fourth wall parts 60. Subsequently, a long side of another narrow metallic sheet is welded to belt part 56, and the short sides are welded to fourth wall parts 60, so that third wall part 58 is formed.

On flat plate part 40, there are arranged a plurality of housing spaces 54 for battery stacks 10. Each housing space 54 is separated by flat plate part 40, first wall parts 42, second wall parts 44, belt parts 56, third wall parts 58, and fourth wall parts 60. More specifically, a range of each housing space 54 in the stacking direction X is defined by a pair of second wall parts 44 and a pair of fourth wall parts 60 both positioned in a row in the stacking direction X. Further, a range of each housing space 54 in the horizontal direction Y is defined by a pair of first wall parts 42 and a pair of third wall part 58 both positioned in a row in the horizontal direction Y. Further, a range of each housing space 54 in the vertical direction Z is defined by flat plate part 40 and belt parts 56 positioned in a row in the vertical direction Z. The plurality of housing spaces 54 are arranged in the horizontal direction Y.

The pair of end plates 34 are disposed in a row together with battery stacks 10 in the stacking direction X in housing spaces 54. One end plate 34 is disposed on one side of housing spaces 54 in the stacking direction X, and another end plate 34 is disposed on the other side of housing spaces 54 in the stacking direction X. End plates 34 are made of metal such as aluminum. Each end plate 34 has: a plurality of main body parts 66 corresponding to the plurality of housing spaces 54; and connecting parts 68 each of which couples neighboring main body parts 66 to each other. That is, each end plate 34 has the following structure: a plurality of main body parts 66 are positioned in a row in the horizontal direction Y, and connecting parts 68 are each disposed between neighboring main body parts 66.

Each main body part 66 has a flattened rectangular parallelepiped shape. Main body part 66 is disposed such that a main surface faces battery stack 10 in a state where main body part 66 is disposed in housing space 54. On an upper surface of main body part 66, there is provided recessed part 70 that is concave downward. A bundle of wires connected to batteries 12, in other words, a member such as a harness is led into housing space 54 from the outside through recessed part 70. Alternatively, a member such as a harness can be led out to the outside from housing space 54 through recessed part 70. An opening (not shown) is provided in an inner wall of container part 2a as necessary, and a members such as a harness is routed around to the outside of housing 2 through the opening. A length of each main body part 66 in the horizontal direction Y is set smaller than a dimension of each housing space 54 in the horizontal direction Y. Each main body part 66 extends in the vertical direction Z in a range from the first main surface of flat plate part 40 to the surface, of each belt part 56, facing flat plate part 40.

Each connecting part 68 has a flat plate shape thinner than main body part 66, and the two surfaces positioned in a row in the horizontal direction Y are connected to main body parts 66. In the present exemplary embodiment, a single piece of metallic sheet is subjected to cutting work or the like to form the plurality of main body parts 66 and the plurality of connecting parts 68. Therefore, the plurality of main body parts 66 and the plurality of connecting parts 68 constitute an integrated object. Each connecting part 68 extends in the vertical direction Z in a range from the first main surface of flat plate part 40 to a position that is lower than the upper end of the main body part 66 by a thickness of the belt part 56. Each connecting part 68 has first cutout part 72, which is cut out upward in the vertical direction Z, in a lower surface directed to first restraining part 30. Further, each connecting part 68 has second cutout part 74, which is cut out downward in the vertical direction Z, in an upper surface directed to second restraining part 32. In a state where battery module 4 is assembled, first wall parts 42 are fit in first cutout parts 72, and third wall parts 58 are fit in second cutout parts 74.

Further, in a lower surface of each connecting part 68, through holes 76 through which fastening members 300 to be described later are inserted are provided on the both sides sandwiching first cutout part 72 in the horizontal direction Y. Similarly, in an upper surface of each connecting part 68, through holes 76 through which fastening members 300 to be described later are inserted are provided on the both sides sandwiching second cutout part 74 in the horizontal direction Y.

Connecting parts 68 are thinner than main body parts 66. Further, connecting parts 68 each have first cutout part 72 and second cutout part 74. This configuration makes end plates 34 slightly flexible at connecting parts 68. With this configuration, each connecting part 68 is deformable depending on a relative displacement of neighboring main body parts 66. Battery stacks 10 may change in dimension due to expansion of batteries 12 or other causes in some cases. In particular, the dimension of each battery stack 10 tends to change more greatly in the stacking direction X of batteries 12. Therefore, neighboring main body parts 66 can be relatively displaced depending on dimension change of battery stacks 10 housed in each housing space 54. To address the displacements, connecting parts 68 can absorb the relative displacements of neighboring main body parts 66 by elastically deforming. As a result, the change in dimension of each battery stack 10 can be absorbed.

Intermediate part 36 is a flat plate-shaped member disposed between battery stacks 10 neighboring in the stacking direction X in each housing space 54. Intermediate part 36 of the present exemplary embodiment has a structure in which a plurality of first parts 78 each corresponding to each housing space 54 are coupled to each other with second parts 80. Intermediate part 36 is made of metal such as aluminum. Intermediate part 36 changes less in dimension than battery stacks 10. In the present exemplary embodiment, a single piece of metallic sheet is subjected to cutting work or the like to form the plurality of first parts 78 and the plurality of second parts 80. Therefore, the plurality of first parts 78 and the plurality of second parts 80 constitute an integrated object.

Each first part 78 has a flat plate shape, and in a state where intermediate part 36 is disposed in housing spaces 54, one main surface of first part 78 is in contact with one battery stack 10, and the other main surface is in contact with another battery stack 10. Each first part 78 extends in the vertical direction Z in a range from the first main surface of flat plate part 40 to the surface, of each belt part 56, facing flat plate part 40. However, first part 78 has stepped parts 82 each concave downward in the vertical direction Z on an end part, of an upper surface directed to second restraining parts 32, in the horizontal direction Y. First part 78 in an area including stepped part 82 extends in the vertical direction Z in a range from the first main surface of flat plate part 40 to the same position as an upper end of connecting part 68. Through hole 84 through which fastening member 300 to be described later is inserted is provided in a surface, of each stepped part 82, directed upward in the vertical direction Z. Further, through hole 84 through which fastening member 300 to be described later is inserted is provided in each end part, in the horizontal direction Y, of a lower surface of first part 78.

Two neighboring first parts 78 are coupled to each other with second part 80. Second part 80 has a columnar shape and extends in the stacking direction X. Second part 80 is connected to side surfaces of first parts 78 at central parts of first parts 78 in the vertical direction Z. Therefore, intermediate part 36 has, above second parts 80, third cutout parts 88 each defined by two side surfaces of first parts 78 and an upper surface of second part 80. Further, intermediate part 36 has, below second parts 80, fourth cutout parts 90 each defined by two side surfaces of first parts 78 and a lower surface of second part 80. In a state where battery module 4 is assembled, third wall parts 58 are fit in third cutout parts 88, and first wall parts 42 are fit in fourth cutout parts 90.

In the present exemplary embodiment, since two battery stacks 10 are housed in each housing space 54, single intermediate part 36 is housed in each housing space 54. However, without being particularly limited to the above configuration, two or more intermediate parts 36 may be provided when three or more battery stacks 10 are housed.

Cooling part 38 is a mechanism for cooling battery stacks 10. Cooling part 38 has cooling plate 92 and cooling medium flow passage 94. Cooling plate 92 has almost the same shape as flat plate part 40 of first restraining part 30 as viewed from the vertical direction Z. Therefore, flat plate 92 has protrusion 96 protruding from one side of the rectangle in an extending direction of the XY plane. Cooling plate 92 is fixed on a second main surface of flat plate part 40 by brazing or the like. Cooling plate 92 has such outer dimensions that cooling plate 92 can be housed in container part 2a.

Cooling medium flow passage 94 is provided on a main surface of cooling plate 92 directed toward flat plate part 40. Cooling medium flow passage 94 of the present exemplary embodiment is configured with a groove provided in the main surface of cooling plate 92. Cooling medium flow passage 94 is liquid-tightly sealed by cooling plate 92 and flat plate part 40. In cooling medium flow passage 94, there flows a cooling medium supplied from the outside of battery pack 1 through a cooling medium pipe. The cooling medium is water or ethylene glycol, for example.

Both ends of cooling medium flow passage 94 are disposed on protrusion 96. Further, one end of cooling medium flow passage 94 is disposed to overlap one of through holes 48 provided in protrusion 46 of flat plate part 40 as viewed from the vertical direction Z. The other end of cooling medium flow passage 94 is disposed to overlap the other of through holes 48 provided in protrusion 46 as viewed from the vertical direction Z. The cooling medium is supplied to cooling medium flow passage 94 from the cooling medium pipe via one of through holes 48, and is collected to the cooling medium pipe via the other of through holes 48 after flowing through cooling medium flow passage 94. Cooling part 38 is thermally connected to battery stacks 10 via first restraining part 30. Battery stacks 10 disposed in housing spaces 54 are each cooled by exchanging heat with the cooling medium flowing through cooling medium flow passage 94.

Battery module 4 is assembled as described below, for example. Specifically, first, a plurality of batteries 12 and a plurality of separators 22 are alternately arranged to form a plurality of battery stacks 10. In this state, battery stacks 10 are not restrained yet. That is, batteries 12 and separators 22 are not fastened to each other yet. Further, first restraining part 30 to which cooling part 38 is fixed is prepared. Then, intermediate part 36 is attached to first restraining part 30. Intermediate part 36 is positioned at a predetermined position, and first wall parts 42 are then fit into fourth cutout parts 90. Subsequently, two battery stacks 10 are put in each of the spaces sandwiched between neighboring first wall parts 42 of first restraining part 30, in a state of being positioned in a row in the stacking direction X. Two battery stacks 10 are housed so as to sandwich intermediate part 36. Two battery stacks 10 are positioned on first restraining part 30 in a state where one end of each battery stack 10 is in contact with first part 78 of intermediate part 36.

Further, at the same time as or before or after battery stacks 10 are housed, a pair of end plates 34 are attached to first restraining part 30. The pair of end plate 34 are disposed so as to sandwich two battery stacks 10 and intermediate part 36 in each housing space 54. Then, first wall parts 42 are fit into first cutout parts 72. Subsequently, second restraining parts 32 are disposed such that each second restraining part 32 overlaps corresponding first wall part 42 as viewed from the vertical direction Z. Then, third wall parts 58 of second restraining parts 32 are fit into third cutout parts 88 of intermediate part 36 and second cutout parts 74 of end plates 34. If battery stacks 10 are put in at the same time as end plates 34 and intermediate part 36 are attached, first end plate 34, first battery stacks 10, intermediate part 36, second battery stacks 10, and second end plate 34 may be arranged in this order to form an assembly, and this assembly may be attached to first restraining part 30.

A bottom surface of each housing space 54, that is, flat plate part 40 is provided with through holes 50 at four corners of housing space 54. Further, at a central part of each housing space 54 in the stacking direction X, there are provided through holes 52. In a state where end plates 34 are attached to first restraining part 30, through holes 76 provided in the lower surfaces of connecting parts 68 overlap through holes 50 of flat plate part 40 as viewed from the vertical direction Z. Fastening members 300 such as bolts are inserted into through holes 50 and through holes 76, so that end plates 34 are fixed to first restraining part 30. Further, in a state where intermediate part 36 is attached to first restraining part 30, through holes 84 provided in the lower surfaces of first parts 78 overlap through holes 52 of flat plate part 40 as viewed from the vertical direction Z. Fastening members 300 are inserted into through holes 52 and through holes 84, so that intermediate part 36 is fixed to first restraining part 30.

Further, each belt part 56 is provided with through holes 62 at four corners. Further, at a central part of each belt part 56 in the stacking direction X, there are provided through holes 64. In a state where second restraining parts 32 are attached to end plates 34 and intermediate part 36, through holes 62 of belt parts 56 overlap through holes 76 provided in the upper surfaces of connecting parts 68 as viewed from the vertical direction Z. Fastening members 300 are inserted into through holes 62 and through holes 76, so that second restraining parts 32 are fixed to end plates 34. Further, in a state where second restraining parts 32 are attached to intermediate part 36, through holes 64 of belt parts 56 overlap through holes 84 provided in the upper surfaces of first parts 78 as viewed from the vertical direction Z. Fastening members 300 are inserted into through holes 64 and through holes 84, so that second restraining parts 32 are fixed to intermediate part 36. Therefore, end plates 34 and intermediate part 36 are fixed to both of first restraining part 30 and second restraining parts 32.

Through the above steps, battery module 4 is obtained. Further, obtained battery module 4 is housed in container part 2a, and lid part 2b is attached to container part 2a, so that battery pack 1 is obtained. Note that, fixing mechanisms other than fastening members 300 may be used to fix first restraining part 30, second restraining parts 32, end plates 34, and intermediate part 36.

In a state where battery module 4 is assembled, that is, in a state where battery stacks 10 are housed in housing spaces 54, side surfaces, of battery stacks 10, positioned in a row in the stacking direction X are in contact with end plates 34. End plates 34 are each in contact with second wall parts 44 and fourth wall parts 60. Therefore, second wall parts 44 and fourth wall parts 60 position battery stacks 10 and batteries 12 in the stacking direction X. Further, side surfaces, of each battery stack 10, positioned in a row in the horizontal direction Y are in contact with first wall parts 42 and third wall part 58. Therefore, first wall parts 42 and third wall part 58 position battery stacks 10 and batteries 12 in the first direction (the horizontal direction Y, in the present exemplary embodiment). Further, a bottom surface of each battery stack 10 is in contact with flat plate part 40, and an upper surface of each battery stack 10 is in contact with belt parts 56. Therefore, flat plate part 40 and belt parts 56 position battery stacks 10 and batteries 12 in a second direction (the vertical direction Z, in the present exemplary embodiment) intersecting the stacking direction X and the first direction.

In the state where battery module 4 is assembled, a predetermined pressure is applied to battery stacks 10 in the stacking direction X. In other words, battery stacks 10 are housed in housing spaces 54 while not being fastened with conventional binding bars. Then, as a result of being housed, battery stacks 10 are fastened by first restraining part 30 and second restraining parts 32 in housing spaces 54.

As described above, battery module 4 according to the present exemplary embodiment includes: battery stacks 10; and first restraining part 30 and a plurality of second restraining parts 32 that restrain battery stacks 10. First restraining part 30 has flat plate part 40, a plurality of first wall parts 42 arranged in a first direction intersecting a stacking direction X, and second wall parts 44 extending in the first direction from end parts of first wall parts 42. Further, the plurality of second restraining parts 32 each have belt part 56 extending parallel to flat plate parts 40, third wall part 58 protruding from belt part 56 toward first wall part 42, and fourth wall parts 60 extending in the first direction from end parts of third wall part 58.

Further, battery module 4 has a plurality of housing spaces 54, for battery stacks 10, each separated by flat plate part 40, belt parts 56, and first wall parts 42 to fourth wall parts 60. In a state where the plurality of battery stacks 10 are housed in housing spaces 54, batteries 12 of each battery stack 10 are fastened to each other. Then, second wall parts 44 and fourth wall parts 60 position battery stacks 10 in the stacking direction X. Further, first wall parts 42 and third wall parts 58 position battery stacks 10 in the first direction. Further, flat plate part 40 and belt parts 56 position battery stacks 10 in the second direction.

In the present exemplary embodiment, single first restraining part 30 and the plurality of second restraining parts 32 less in number than a number of housed battery stacks 10 are used to collectively fasten the plurality of battery stacks 10. That is, the plurality of battery stacks 10 shares the restraining parts. Therefore, a number of components can be reduced compared with a structure in which, like conventional battery packs, a plurality of battery stacks 10 are housed in a housing after being individually restrained, and it is also possible to simplify a manufacturing process. Further, first restraining part 30 and second restraining parts 32 functioning as binding bars for battery stacks 10 are assigned with a function of positioning battery stacks 10. Also with this arrangement, the number of components can be reduced compared with the conventional battery pack. Further, it is possible to arrange batteries in a different manner from a case where conventional battery stacks, which are individually made in a module structure, are installed in a housing. Therefore, it is possible to enhance a degree of freedom in arrangement of batteries. As a result, upon mounting battery pack 1 on a vehicle or the like, it is possible to efficiently dispose battery pack 1.

Further, since first restraining part 30 and second restraining parts 32 constitute a structure to collectively restrain the plurality of battery stacks 10, first restraining part 30 and second restraining parts 32 can be assigned with a function of reinforcing housing 2. That is, first restraining part 30 and second restraining parts 32 can increase rigidity of housing 2. Therefore, rigidity required of container part 2a and lid part 2b can be low. Therefore, a shape and dimensions of housing 2 can easily be changed.

Further, battery module 4 has end plates 34. Battery stacks 10 are sandwiched by the pair of end plates 34. This arrangement enables battery stacks 10 to be more securely fixed. End plates 34 each have: a plurality of main body parts 66 corresponding to the plurality of housing spaces 54; and connecting parts 68 each of which couples neighboring main body parts 66 to each other. That is, each end plate 34 has such a structure that end plates each corresponding to battery stack 10 in each housing space 54 are integrated into one body. This structure can reduce a number of components of battery module 4. Further, each connecting part 68 has first cutout part 72 in which first wall part 42 is fit and second cutout part 74 in which third wall part 58 is fit. This arrangement enables end plates 34 to be attached to first restraining part 30. Note that end plates 34 may be omitted. In that case, second wall parts 44 and fourth wall parts 60 play roles of the end plates.

Further, battery module 4 houses the plurality of battery stacks 10 in individual housing spaces 54. Further, in each housing space 54, intermediate part 36 is disposed between neighboring battery stacks 10. Intermediate part 36 is fixed to first restraining part 30 and second restraining parts 32. This arrangement can further increase rigidity of battery module 4, thereby further increasing rigidity of battery pack 1. Further, intermediate part 36 does not expand like batteries 12. Therefore, by providing intermediate part 36, it is possible to reduce force applied to first restraining part 30 and second restraining parts 32 due to the dimension change of battery stacks 10.

Further, battery module 4 includes cooling part 38. Cooling part 38 is thermally connected to battery stacks 10 via first restraining part 30. This arrangement can reduce performance deterioration of batteries 12 due to a temperature rise. Further, flat plate part 40, first wall parts 42, and second wall parts 44 are in contact with battery stacks 10. This arrangement enables heat of batteries 12 to be absorbed not only from the bottom surfaces of battery stacks 10 but also from the side surfaces of battery stacks 10. As a result, battery stacks 10 can be cooled more efficiently.

The present invention is not limited to the above-mentioned exemplary embodiment, and modifications such as various design changes can be added based on knowledge of those skilled in the art. The modified exemplary embodiments are also included in the scope of the present invention. A new exemplary embodiment made by adding modifications to the above-mentioned exemplary embodiment also has respective effects of the combined exemplary embodiments and the modified exemplary embodiments.

Modified Example

Figure 4:
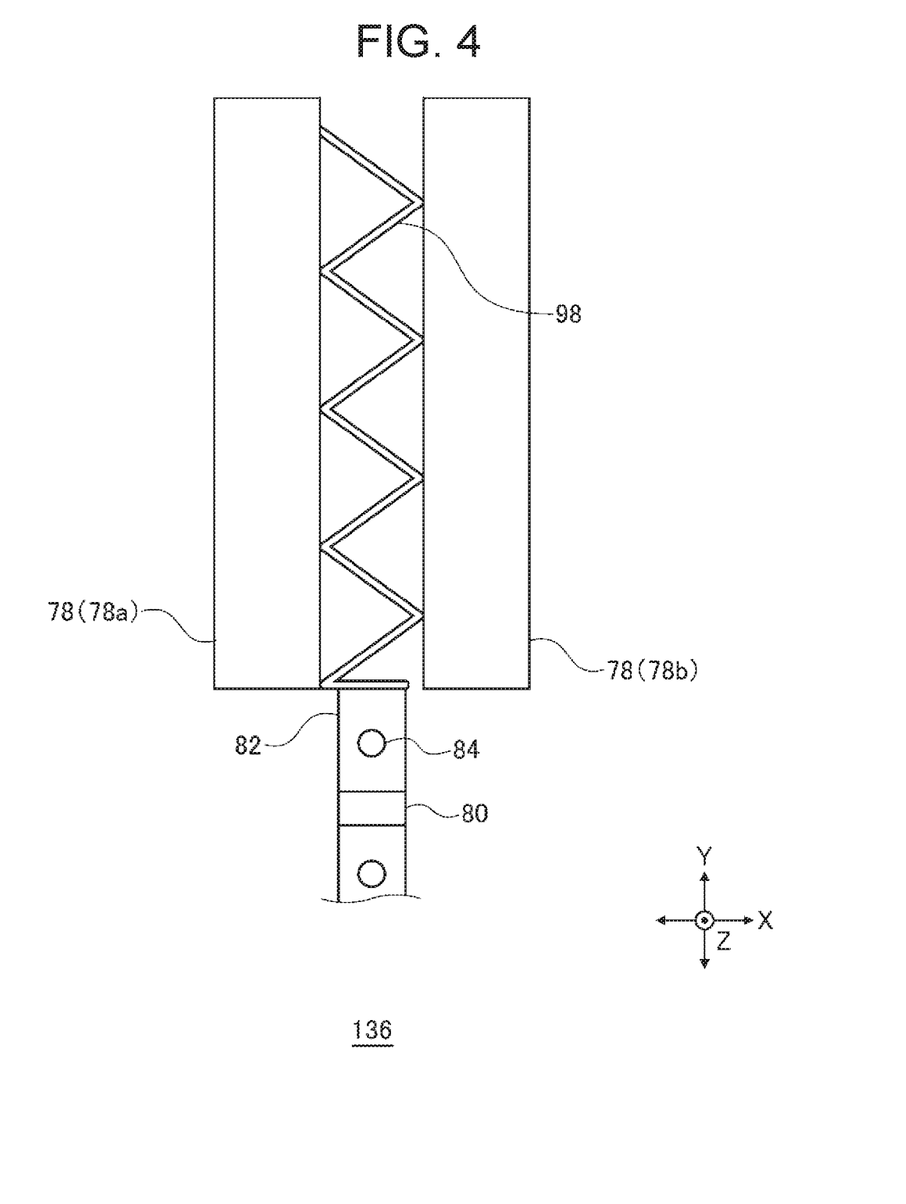
FIG. 4 is a partially enlarged plan view of an intermediate part included in a battery module according to a modified example.

FIG. 4 is a partially enlarged plan view of an intermediate part included in a battery module according to a modified example. Battery module 4 according to the modified example includes elastic part 98 arranged in a row with battery stacks 10 in the stacking direction X in housing space 54. Elastic part 98 is deformable in the stacking direction X. FIG. 4 illustrates elastic part 98 embedded in intermediate part 136. Intermediate part 136 has first part 78 and second part 80. A part of first part 78 except stepped part 82 is divided into two small plates 78a and 78b. Elastic part 98 has an accordion shape and is sandwiched between small plates 78a and 78b.

If small plate 78a and small plate 78b are displaced due to expansion of battery stacks 10 in such a direction that small plate 78a and small plate 78b become closer to each other, each piece of the accordion bends, and a dimension of elastic part 98 in the stacking direction X thus decreases. This can absorb the dimension change of battery stacks 10. Further, elastic part 98 can compensate, in the stacking direction X, a difference between a total dimension of battery stacks 10, end plates 34, and intermediate part 36 housed in housing space 54 and a dimension of housing space 54. Therefore, battery stacks 10 can be fixed more securely in the stacking direction X. Further, a number of batteries 12 constituting battery stacks 10 can be more freely set.

Elastic part 98 may be configured with a known elastic structure such as a spring or may be configured with an elastic material such as rubber. Further, elastic part 98 may be disposed between battery stack 10 and intermediate part 36, between battery stack 10 and end plate 34, between end plate 34 and second wall part 44 as well as fourth wall part 60, and other places.

(Others)

There is no particular limitation to the number of batteries 12 included in each battery stack 10, the number of housing spaces 54, or the number of battery stacks 10 housed in each housing space 54. Battery stacks 10 and cooling part 38 may be thermally connected to each other via an arbitrary heat-conductive member. The following are also valid as aspects of the present invention: any combinations of the above-described structural components; and expressions into which the expressions of the present invention are converted between method, apparatus, system and the like.

The invention claimed is:
1. A battery module comprising:
  a battery stack having a plurality of batteries being stacked; and a first restraining part and a plurality of second restraining parts that restrain the battery stack, wherein the first restraining part has:
- a flat plate part;
- a plurality of first wall parts that protrude from a main surface of the flat plate part, extend in a stacking direction of the batteries, and are arranged in a first direction intersecting the stacking direction; and
- second wall parts extending in the first direction at end parts, in the stacking direction, of the first wall parts, each of the plurality of second restraining parts is disposed corresponding to at least a part of each of the plurality of first wall parts and has:
- a belt part extending parallel to the flat plate part;
- a third wall part protruding from the belt part toward the first wall part and extending in the stacking direction; and
- fourth wall parts extending in the first direction at end parts, in the stacking direction, of the third wall part, and on the flat plate part, there are arranged a plurality of housing spaces for a plurality of the battery stacks, and each of the plurality of housing spaces is separated by the flat plate part, the first wall parts, the second wall parts, the belt parts, the third wall part, and the fourth wall parts.

2. The battery module according to claim 1, wherein, in a state where the plurality of battery stacks are housed in the housing spaces,
the second wall parts and the fourth wall parts position the plurality of battery stacks in the stacking direction,
the first wall parts and the third wall parts position the plurality of battery stacks in the first direction, and
the flat plate part and the belt parts position the plurality of battery stacks in a second direction intersecting the stacking direction and the first direction.

3. The battery module according to claim 1, further comprising an end plate disposed in a row with the plurality of battery stacks in the stacking direction in the housing spaces, wherein the end plate has:
- a plurality of main body parts each corresponding to each of the housing spaces; and
- connecting parts each of which couples neighboring main body parts of the plurality of main body parts to each other, and each of the connecting parts has cutout parts in which each of the first wall parts and each of the third wall parts are fit in.

4. The battery module according to claim 1, wherein the plurality of battery stacks are housed in a row in the stacking direction in each of the housing spaces, the battery module further comprising an intermediate part that is disposed between neighboring battery stacks of the plurality of battery stacks and is fixed to the first restraining part and the second restraining parts.

5. The battery module according to claim 1, further comprising a cooling part thermally coupled to the plurality of battery stacks via the first restraining part to cool the plurality of battery stacks.

6. The battery module according to claim 1, further comprising an elastic part that is arranged in a row with the plurality of battery stacks in the stacking direction in each of the housing spaces and is deformable in the stacking direction.

7. The battery module according to claim 4, wherein the intermediate part has an elastic part that is deformable in the stacking direction.

8. The battery module according to claim 4, wherein the plurality of battery stacks are positioned by the first restraining part in a state where one end of each of the plurality of battery stacks is in contact with the intermediate part.

* * * * *